Jan. 13, 1925. 1,523,226
V. MAGGIO
APPARATUS FOR MANUFACTURING ALL KINDS OF HOLLOW CYLINDRICAL
TUBES AND PIPES, ETC
Filed Aug. 10, 1921 4 Sheets-Sheet 1
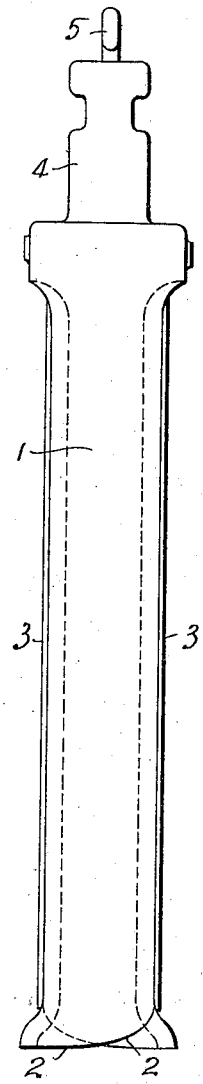
Fig.1.
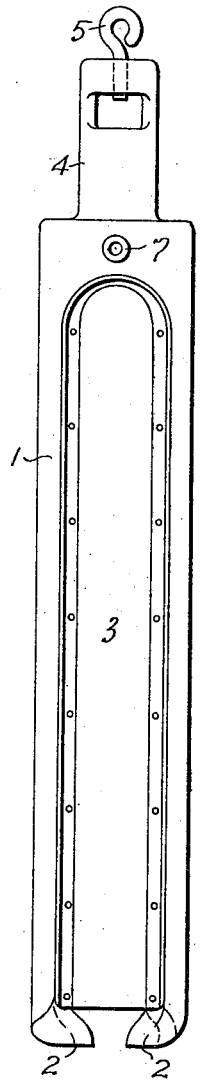
Fig.2.
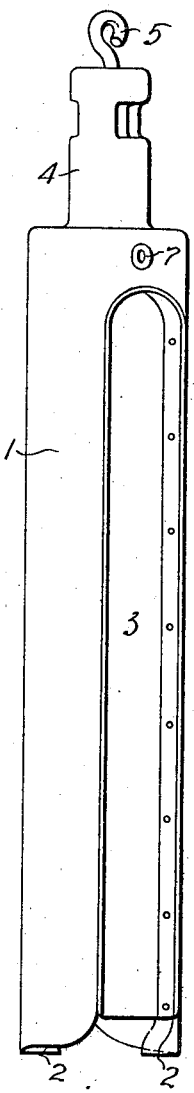
Fig.3.
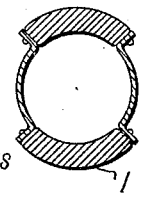
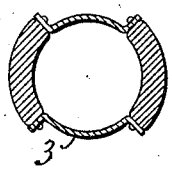
WITNESSES
INVENTOR
VICTORIO MAGGIO
BY
ATTORNEYS Jan. 13, 1925.   1,523,226
V. MAGGIO
APPARATUS FOR MANUFACTURING ALL KINDS OF HOLLOW CYLINDRICAL
TUBES AND PIPES, ETC
Filed Aug. 10, 1921    4 Sheets-Sheet 2

WITNESSES

INVENTOR
VICTORIO MAGGIO
BY
ATTORNEYS

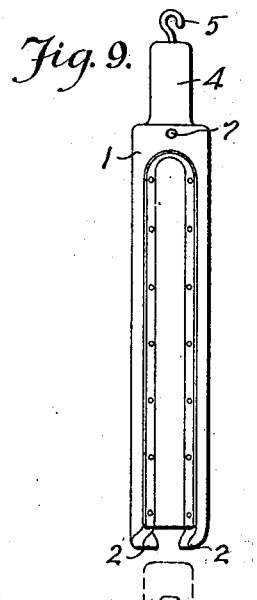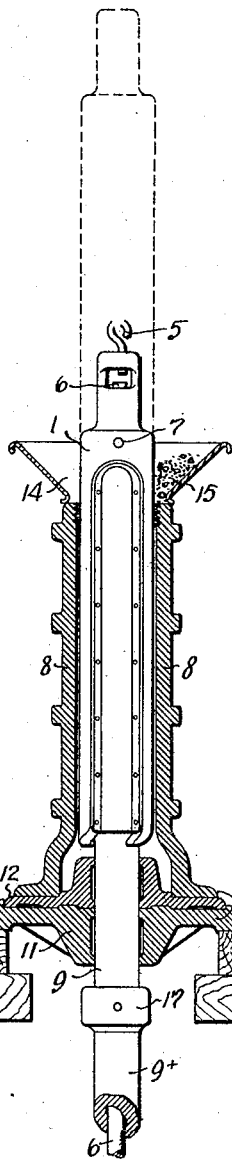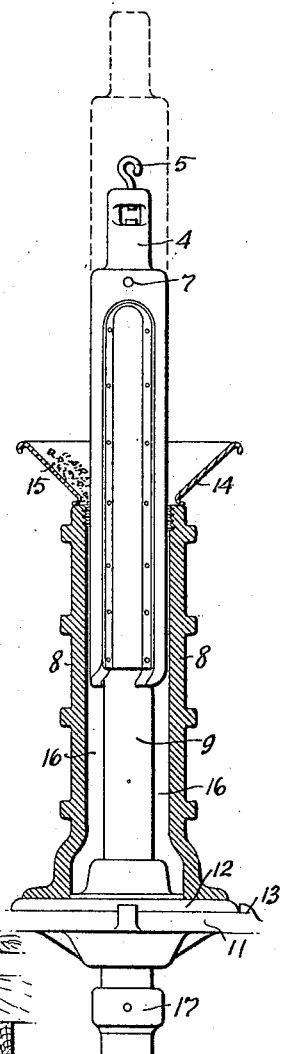

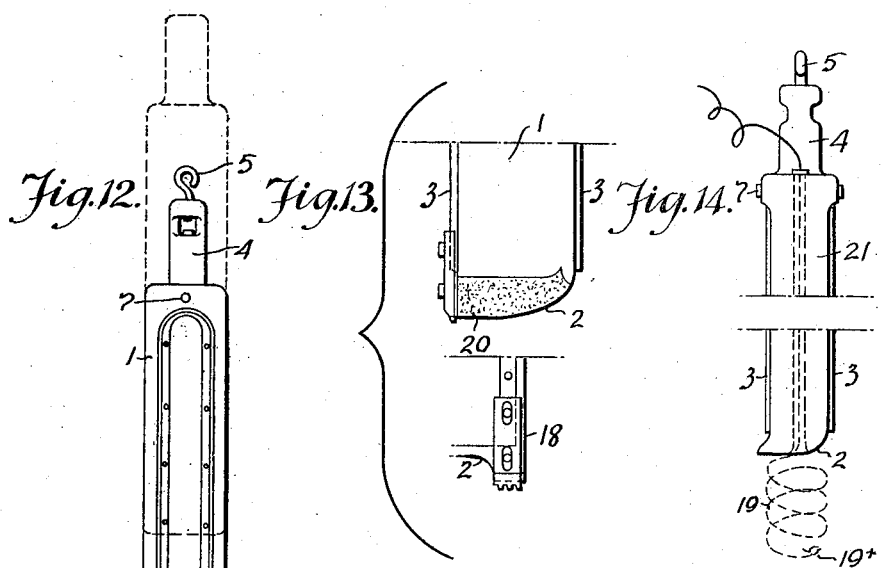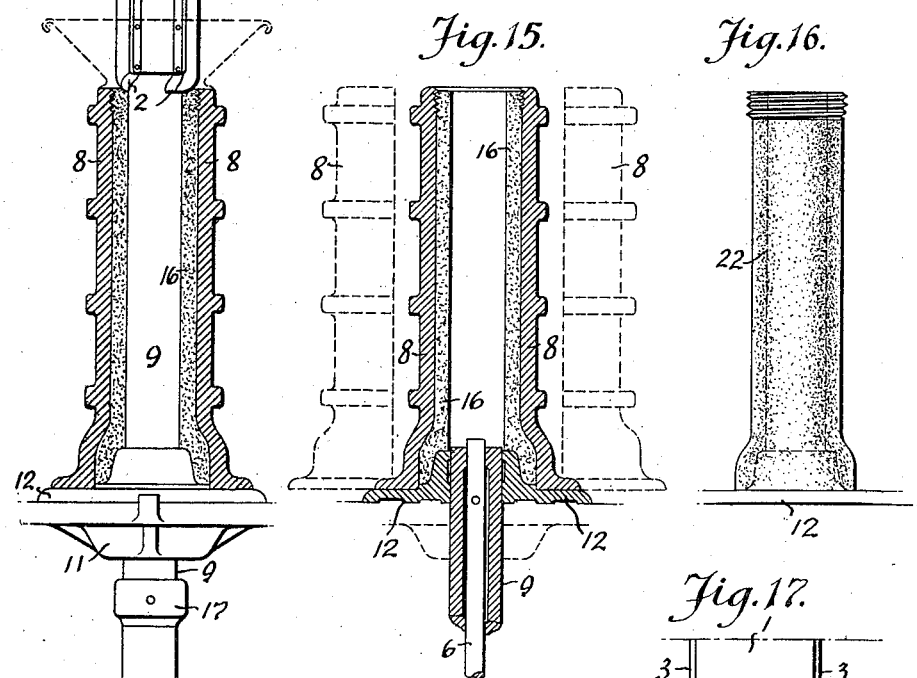

Patented Jan. 13, 1925.

1,523,226

UNITED STATES PATENT OFFICE.

VICTORIO MAGGIO, OF BUENOS AIRES, ARGENTINA.

APPARATUS FOR MANUFACTURING ALL KINDS OF HOLLOW CYLINDRICAL TUBES AND PIPES, ETC.

Application filed August 10, 1921. Serial No. 491,318.

*To all whom it may concern:*

Be it known that I, VICTORIO MAGGIO, a citizen of the Argentine Republic, and a resident of Buenos Aires, capital of the Argentine Republic, have made certain new and useful Improvements in an Apparatus for Manufacturing All Kinds of Hollow Cylindrical Tubes and Pipes, Etc., of which the following is a specification.

This invention refers to an apparatus for manufacturing all kinds of hollow, cylindrical tubes and pipes and solid columns or any other circular piece made from plastic material or other compressed materials, with or without metallic reinforcement.

The figures mentioned below refer to those found on drawings attached.

Figures 1, 2 and 3 show the compressor in geometrical projection, front side and perspective views of same, with their various sections when erected.

Fig. 9 shows sectional view and elevation of the whole before operating.

Fig. 10 shows the same view immediately after starting operations.

Figure 4:
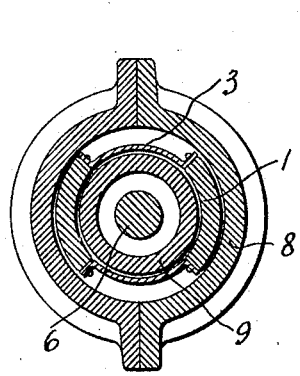
Fig. 4 shows a section of the compressor installed and ready to operate.

Fig. 11 a similar view with the compressor partly withdrawn from the mold.

Fig. 12 idem after the finished operation.

Fig. 13 shows disposition of comb or points or shoes on compression planes.

Fig. 14 shows disposition in compression of metal wire for reinforcing the mortar or concrete.

Fig. 15 shows how form or mould is opened to extract the manufactured tubes.

Fig. 16 shows position of the manufactured tube taken out of the form or mould and resting on the base plate.

Fig. 17 shows position of reexchange pieces of shoes.

The manufacture of hollow cylindrical tubes and pipes and solid columns or any other circular piece made from concrete or some other compressed material has always until now offered a series of difficulties which made it impossible to insure the quality and strength required from such parts or articles to render really reliable services. This being the case they have therefore been of only limited importance for constructional undertakings. This fact is certainly due not so much to the quality of the raw materials used in the manufacture but rather to the way in which the articles are produced by manual labour as no means have been found so far to manufacture them in a fashion which adapts itself to the peculiarities of the material used.

The actual procedure of known systems offers various inconveniences of such a nature that they result inferior to the common baked clay tubes and pipes.

Some of these drawbacks may be mentioned for instance with the known systems used at present the normal cementing of the material is to a great extent destroyed by the excess of water contained in the material when in its fluid state for moulding purposes.

In these conditions proper compression is practically out of the question as continuous dissolutions occur with the consequent peril that great air bubbles are apt to form throughout the material, disintegrating same; just as serious is the fact that the spreading out of the material with a view to the necessarily slow process of cementing causes the separation or disintegration of its component particles owing to the varying densities.

The slow cementing of the material due to the excess of water which it contains and the impossibility of effecting any compression of the material to drive out the air which it contains so as to obtain the most thorough cohesion of its component particles, carry with them as a result a large amount of evaporation due to the absolute lack of compression of the material; for this reason the resistance which it ought to offer to the various pressures required is very largely reduced, a fact which naturally leads to permeability.

In order to avoid these drawbacks, caused by lack of compression and excess of water in the material, the producers have endeavoured if not to conquer them then at least to mitigate said inconveniences by adopting costly means, such as for instance lining with bituminous materials or even plates, but the impracticability of the system in view of its costs and results lead to the failure of the undertaking.

The only feasible way of manufacturing this class of materials consists in avoiding an excess of water in the material, this naturally favoring the normal process of cementing, and exerting a thorough and uniform compression of the material to expel the air contained in same completely so as to secure a perfect cohesion of its components. Only thus is the required resistence and impermeability of the material obtained.

The chief object of this new apparatus is to make possible the manufacture of cylindrical hollow pipes and tubes or any other similar article (without taking dimensions and thickness into consideration) with ordinary material, compressed under the desired pressure and uniformly and perfectly shaped; with or without metal reinforcement in the body of the material.

As will be seen Figures 1, 2 and 3 represent distinct aspects of the compressor 1 which may or may not be a solid cast piece, and which has the shape of a hollow cylinder with two or more lengthwise openings or windows; the solid part of this cylinder having two arms or shovels with inclined or helical planes attached at the bottom 2. These openings or windows are closed in their entire extent by a thin metal plate 3. This aggregate is at the top provided with an extension 4 which serves both as a juncture for the suspension hook 5 and also, by means of a wedge 7 the top muff of the counter shaft 6 which transmits the adjusted rotatory movement.

Fig. 4 shows sectionally the position of the compressor 1 inside the form or mould 8; the position of the counter shaft 6, that of the shaft 9 and the configuration resulting from the openings or windows of the compressor 1 when inside the form or mould 8, the opening or hollow or open part of which forming a chamber, serves for the introduction of the material 15.

Figure 5:
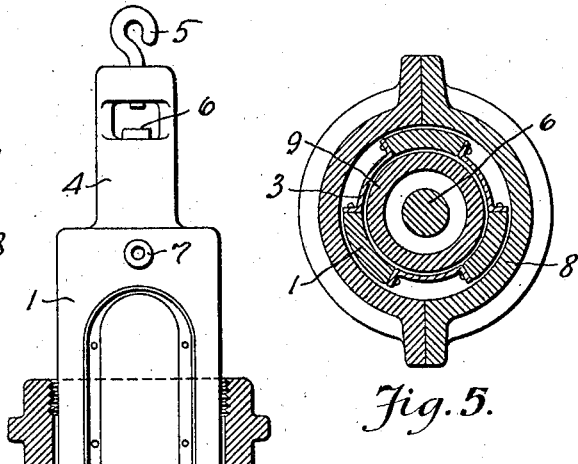
Fig. 5 shows a variation of Fig. 4.

Fig. 5 shows a variation of above, the compressor 1 having three arms and three openings or windows, the number of which may be increased according to requirements.

Figure 6:
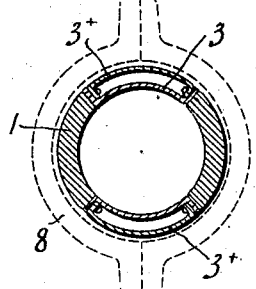
Figs. 6 and 7 show other variations of same.
Figure 7:
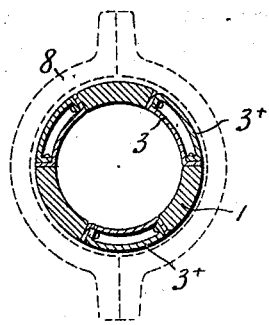

Figs. 6 and 7 respectively show a variation of the previously mentioned Figures 4 and 5 but the chambers are provided with a second plating 3' outside forming a box, thus preventing the material 15 which slides inside the mould 8 from wearing and rubbing the inside wall of same.

Figure 8:
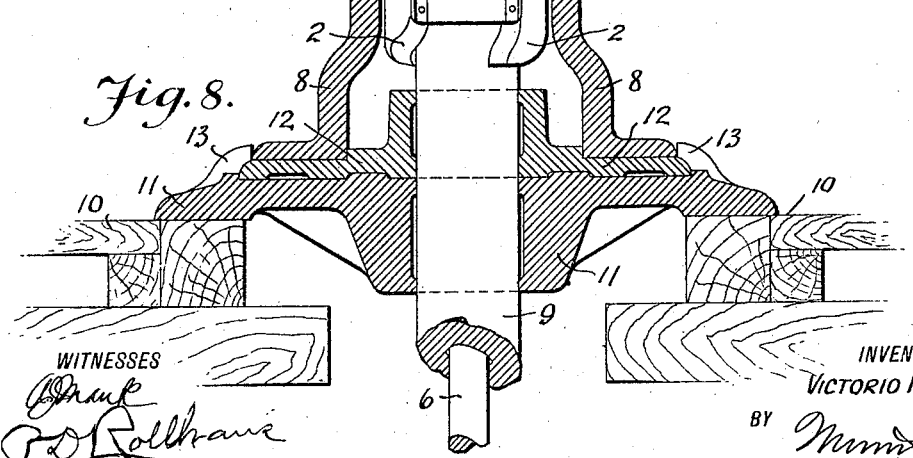
Fig. 8 shows vertical section of compressor ready to operate.

Fig. 8 shows in section and elevation the aggregate of the apparatus the moment it starts functioning.

As will be seen the piece or base 11 through which the shaft 9 passes and on which is placed the plate 12 coupled to the form or mould 8, is placed on a solid support 10. Said plate 12 is retained in the base 11 by means of notches 13. The shaft 9 at top and the counter shaft 6 at its upper end are joined to the compressor 1 by means of the wedge 7, being thus both joined with a view to the rotatory movement of the counter shaft 6 independently of shaft 9 and 9'.

Figs. 9, 10, 11 and 12 are views in elevation of the various aspects of the movement and operation of the aggregate.

To particularize: Fig. 9 shows the operation preceding the functioning. The form or mould 8 with is respective plate 12 is placed on the base 11. The shaft 9 in its position of elevation as well as the counter shaft 6. The compressor 1 suspended for the disposition of the funnel or hopper 14 and the form or mould 8.

Figs. 10 and 8 show the start of the operation. The compressor 1 has been lowered to a convenient depth into the ring shaped space formed between the body of the mould 8 and the shaft 9.

The counter shaft 6 wedged onto the compressor 1 by means of the wedge 7. Putting the counter shaft 6 in a rotatory movement, the shaft transmits same to the compressor 1 and causes the plastic material 15 to enter the funnel or hopper 14, which by gravity falls sliding through the chambers formed by the openings in the compressor 1, reaching the foot of same where it is compressed by the inclined or helical planes 2 of the compressor 1.

Fig. 11 shows the aggregate in full operation, i. e. half way through the distance travelled by the compressor 1 part 16 of which is the compressed plastic material.

Fig. 12 shows the operation and working completed. The rotatory movement of the counter shaft 6 has ceased.

Fig. 13 shows the application of a comb or points 18 placed in the vertical and outside part of each inclined or helical plane 2 of the compressor 1.

Fig. 14 shows one of the various arrangements for the introduction of the wire 19 at the foot of the compressor 1.

Fig. 15 shows the diverse ways of separating the form or mould 8 from the body of the ready manufactured tube 22.

Fig. 16 shows the position in which the manufactured tube 22 remains on the plate 12 until such a time as through the process of cementing it has acquired the consistency necessary for handling it.

Fig. 17 shows the removable piece or shoe 20 to provide for the wear caused by friction.

*Working.*

The mould 8 with its respective plate 12 attached is placed on the base 11 kept in a vertical position by the lugs 13 as will be seen from Figs. 8, 9 and 10. In this position the shaft 9 and 9' and counter shaft 6 are raised to the height indicated in Fig. 9. The funnel or hopper 14 is placed in the mouth or upper part of the form or mould 8. The arrangement of this aggregate being now completed the compressor 1 is lowered so as to occupy the vertical and ring shaped room or space existing between the mould 8 and the shaft 9, and the compressor must then be joined to the counter shaft 6 by means of the wedge 7. Everything having now been arranged in the fashion shown in Fig. 10 the apparatus is now started operating by imparting a rotatory movement to the counter shaft 6 which transmits this movement to the compressor 1 emptying the plastic material into the funnel or hopper 14; the mortar by its weight falls to the foot of the inclined or helical plane 2 where it is caught and compressed. Continuing the rotary movement and owing to the degree of incompressibility acquired by the mortar through the pressure exercised by the compressor 1, the latter has a tendency to rise gradually and in proportion to the quantity of material held fast by the helical planes 2, the effect of this being the uniform and gradual displacement of the compressor 1 as shown in Fig. 11 representing its travel half-way through.

Still continuing the rotatory movement of the counter shaft 6, the compressor 1, as shown in Fig. 12, will now have obtained the maximum of its displacement and the effect of compression, even though the movement be continued, will be nought seeing that its helical planes 2 being now on a level with the top of the mould the material 15 will find no entrance.

In these conditions the movement of the counter shaft 6 is now discontinued and the compressor 1 suspended by means of its hook at top and maintained at the convenient height shown in Fig. 9, the wedge 7 having previously been disconnected. The funnel or hopper 14 is withdrawn and by means of the joint between the coupling 17 and the shaft 9' a short rotatory movement is imparted to the shaft 9 so as to smooth the interior and the entire surface area of the contact which had taken place between the shaft 9 and the compressed motor 16 and which corresponds to the interior or hollow of the tube or piece 16 and 22 manufactured.

This operation being finished the shaft 9 is lowered by means of the shaft 9' in combination with the counter shaft 6, this lowering lowering the internal neck of the plate 12, and loosening the lugs 13 which hold said plate and the form or mould 8 firmly in position, this aggregate is now withdrawn and put in its place whereafter the mould 8 is opened as shown in Fig. 15 in order to extract from inside it the manufactured tube or piece 22 as indicated in Fig. 16; repeating the aforesaid easy operation the manufacture of a new piece or tube 22 can now be started and so on.

In conformity with and according to the material used and to insure the serviceableness of the manufactured piece the proper precautions must be observed.

The motive power for the operating of this apparatus may be of various kinds, and the mechanism and joints or coupling to produce the movements indicated may be of any form and construction.

To obtain a greater or minor force of compression on the material counter weights may be employed or else the compressor 1 and the counter shaft 6 supplied with weights, springs or elastics conveniently arranged.

The rotatory movement may be inverted, that is to say, the compressor 1, the shaft 9 and 9' and the counter shaft 6 may be stationary and the rotatory movement imparted to the form or mould 8, plate 12 and the bed base 11, likewise the movement and suspension of the compressor 1 may be obtained by means of a stationary and rigid piece which permits its conveying and rotation.

The entire mechanism for the movement of the aggregate may be placed over the compressing apparatus and for this purpose any mechanism may be used.

The mechanism for opening and closing the form or mould 8 may be of any description and also in two or more parts.

The arms or shovels of the compressor may be more than two according to the force of compression required as shown in Figs. 5, 6 and 7.

The part of the shaft 9 which corresponds with the interior of the form or mould 8 and shapes or forms the hollow of the pipe or piece 22 to be manufactured may be slightly conical in order to facilitate its easy descent in case of necessity.

The muff or flange of the pipe or piece 22 to be manufactured need not be like that shown in the drawings but simply straight and grooved.

The reexchange pieces or shoes 20 of Figs. 13 and 17, supplementarily attached to the inclined or helical planes 2 of the compressor 1, are intended to provide for the wear produced by the friction of the material 15 and may be of any exceedingly tough material.

The placing of the wire forming the reinforcement in the body of the material is effected, as shown in Fig. 14, by means of the conduit 21 made vertically and centrally in the solid part of the shovel of the compressor 1, the wire 19 entering through the upper part and passing through on a level with the helical plane 2 at the end of which a bend or knot 19' is made, serving as an anchor in the material 16, the rotatory movement of the compressor 1 distributing it in a spiral shape in the material.

Fig. 13 shows the adoption of a comb 18 attached at the top of each shovel of the compressor 1 and its corresponding helical plane 2 in order to break to some slight extent the layer of material and facilitate a quick and thorough contact amongst the layers of material 15 which is being compressed.

Having described my invention and the manner of using it I declare and claim as my exclusive patent rights:

1. An apparatus for manufacturing pipe, tubes, columns and the like from plastic material, comprising a sectional cylindrical mold, a hopper on the mold, a hollow shaft movable in and out of the shaft, a second hollow shaft coupled to the lower end of the first shaft, a revoluble shaft in the hollow shafts and projecting above the first named hollow shaft, a hollow compressor having longitudinal passages forming with the mold chambers through which the plastic material enters the mold, and means for removably securing the compressor to the upper end of said revoluble shaft.

2. In an apparatus of the character described, a centrally apertured base, a plate secured to the base plate and having a neck, the plate and neck having an opening in alinement with the opening of the base plate and a sectional cylindrical mold coupled to the said plate.

3. In an apparatus of the character described, and as claimed in claim 2, removable shoes for the compressor.

4. In an apparatus of the character described, and as claimed in claim 2, the compressor provided with a longitudinal opening for the passage of a reinforcing wire.

5. In an apparatus of the character described, a hollow compressor having longitudinal openings, and plates closing the openings and forming longitudinal passages therein.

All in conformity with the foregoing description and the accompanying drawings.

VICTORIO MAGGIO.